United States Patent
Griffith et al.

(10) Patent No.: US 10,818,103 B2
(45) Date of Patent: Oct. 27, 2020

(54) ENGINE HEALTH AND LIFE CYCLE TRACKING SYSTEM

(71) Applicant: HONEYWELL INTERNATIONAL INC., Morris Plains, NJ (US)

(72) Inventors: Tim Griffith, Mesa, AZ (US); Richard Cotter, Phoenix, AZ (US); Richard Douglas, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/556,793

(22) Filed: Aug. 30, 2019

(65) Prior Publication Data

US 2020/0013239 A1    Jan. 9, 2020

Related U.S. Application Data

(63) Continuation of application No. 15/483,563, filed on Apr. 10, 2017, now Pat. No. 10,489,991.

(51) Int. Cl.
  *G07C 5/00*  (2006.01)
  *B64D 45/00*  (2006.01)
  (Continued)

(52) U.S. Cl.
  CPC ............. *G07C 5/008* (2013.01); *B64D 45/00* (2013.01); *G06F 16/22* (2019.01);
  (Continued)

(58) Field of Classification Search
  None
  See application file for complete search history.

(56) References Cited

U.S. PATENT DOCUMENTS 7,551,086 B2    6/2009  Coop et al.
7,598,868 B2    10/2009  Lee et al.
(Continued)

FOREIGN PATENT DOCUMENTS

WO    2009070347 A1    6/2009
WO    2016115424 A1    7/2016

OTHER PUBLICATIONS

Extended European search report for Application No. 18165564.8-1222 dated Jul. 30, 2018.

*Primary Examiner* — Todd Melton
*Assistant Examiner* — Jason R Roberson
(74) *Attorney, Agent, or Firm* — Lorenz & Kopf, LLP

(57) ABSTRACT

An engine-mounted component life cycle data tracking system is provided. The system includes a plurality of RFID tags associated with, positioned proximate to, and configured to transmit and store identification, repair history, and dynamic data regarding a different engine component of a plurality of engine components, wherein the dynamic data includes engine usage, component usage, and/or component fault information. The system further includes an aircraft-mounted controller that includes non-transient computer readable storage media. The controller is configured to: store identification and repair history data retrieved from the RFID tags in the storage media; store dynamic data for the plurality of engine components in the storage media after each engine cycle; and transmit dynamic data to the RFID tags after each engine cycle for storage. After each engine cycle, the aircraft-mounted controller includes in its storage media the identification, repair history and dynamic data for the plurality of engine component.

20 Claims, 5 Drawing Sheets

(51) Int. Cl.
*G06K 19/077* (2006.01)
*G07C 5/08* (2006.01)
*G06F 16/22* (2019.01)
*G06F 16/2455* (2019.01)
*G06Q 10/08* (2012.01)

(52) U.S. Cl.
CPC . *G06F 16/24553* (2019.01); *G06K 19/07758* (2013.01); *G06Q 10/08* (2013.01); *G07C 5/085* (2013.01); *B64D 2045/0085* (2013.01); *G07C 5/006* (2013.01)

(56) References Cited

U.S. PATENT DOCUMENTS

| | | |
|---|---|---|
| 9,239,578 B2 | 1/2016 | Ziarno |
| 9,507,982 B2 | 11/2016 | Mylaraswamy et al. |
| 2007/0114280 A1* | 5/2007 | Coop .................. G06Q 50/30 235/385 |
| 2008/0086509 A1* | 4/2008 | Wallace ................ G06F 16/285 |
| 2012/0041639 A1 | 2/2012 | Followell et al. |
| 2016/0314328 A1 | 10/2016 | Hosamane et al. |
| 2016/0362197 A1 | 12/2016 | Chippar et al. |

* cited by examiner

ENGINE HEALTH AND LIFE CYCLE TRACKING SYSTEM

CROSS-REFERENCE TO RELATED APPLICATION

This application claims the benefit as a continuation of U.S. patent application Ser. No. 15/483,563, having the same title as this application, and filed on Apr. 10, 2017. This application incorporates the prior application into the present application by reference.

TECHNICAL FIELD

The technology described in this patent document relates generally to aircraft engine component life cycle tracking systems and more particularly to using RFID tags to track the life cycle of aircraft engine components.

BACKGROUND

Aircraft engine component maintenance data such as LRU and component life in hours, operating cycles, associated engine and overhaul information is typically recorded manually. Because data is recorded manually, errors may occur in the recording of data and the data may not be recorded in real time. Accordingly, it is desirable to provide an automated system that can automatically record engine component maintenance data.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method in an aircraft-mounted controller is provided. The method includes reading data from and writing data to a plurality of radio frequency identification (RFID) tags positioned around an aircraft engine wherein each RFID tag is associated with and positioned proximate to a different one of a plurality of engine components and each RFID tag is configured to transmit and store data regarding its associated engine component. The method further includes storing in a component database static data, repair data, and dynamic data regarding the plurality of engine components wherein the static data includes identification information regarding the engine components, the repair data includes repair history information regarding the engine components that is recorded by the RFID tags during visits by their associated engine component to a repair shop, and the dynamic data includes engine usage information, component usage information, and component fault information regarding the engine components. The method further includes transmitting the dynamic data regarding the associated engine component to each RFID tag after each engine cycle for storage in the RFID tag and transmitting static data, repair data, and dynamic data regarding one of the engine components to an external system responsive to a request by the external system.

An engine-mounted component life cycle data tracking system is provided. The system includes a plurality of radio frequency identification (RFID) tags positioned around an aircraft engine wherein each RFID tag is associated with and positioned proximate to a different engine component and each RFID tag configured to transmit and store data regarding its associated engine component. The system further includes an engine-mounted communication module configured to read data from and write data to each RFID tag and an aircraft-mounted controller in communication with the engine-mounted communication module. The aircraft-mounted controller is configured to perform operations to retrieve, using the communication module, static data and repair data from each RFID tag wherein the static data includes identification information regarding the engine component and the repair data includes repair history information regarding the engine components resulting from any visit by any of the engine components to any repair shop. The aircraft-mounted controller is further configured to store the static data and the repair data for each engine component in a database in the controller and store dynamic data in the database for each engine component after each engine cycle wherein the dynamic data includes engine usage information, component usage information, and component fault information regarding the engine component. The aircraft-mounted controller is further configured to transmit, using the communication module, the dynamic data regarding the engine component to each RFID tag after each engine cycle for storage in the RFID tag

BRIEF DESCRIPTION OF THE DRAWINGS

Aspects of the present disclosure are best understood from the following detailed description when read with the accompanying figures, wherein like numerals denote like elements.

DETAILED DESCRIPTION

The subject matter described herein discloses apparatus, systems, techniques and articles for automatically tracking engine component life cycle data. The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, summary, or the following detailed description.

Figure 1:
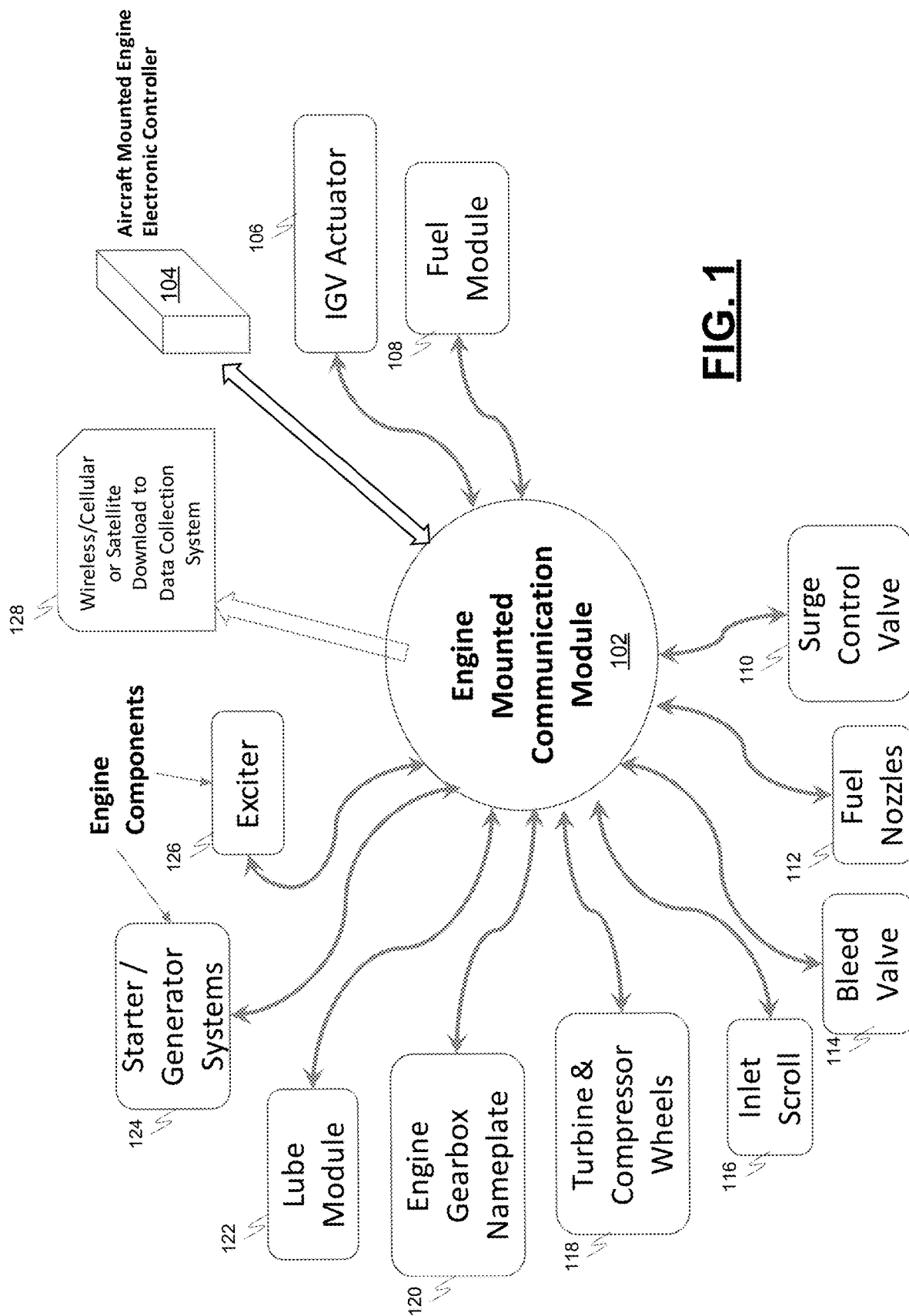
FIG. 1 is a block diagram depicting example components on an example aircraft engine, in accordance with some embodiments.

FIG. 1 is a block diagram depicting example components on an example aircraft. The example aircraft includes an engine mounted communication module 102, an aircraft mounted engine electronic controller 104, and a plurality of engine components comprising a plurality of line replaceable units (LRUs) 106, 108, 110, 114, 122, 124, 126 and other engine components 112, 116, 118, 120. The LRUs 106, 108, 110, 114, 122, 124, 126 and the other engine components 112, 116, 118, 120 are each equipped with radio frequency identification (RFID) tags mounted on or proximate thereto that can transmit, receive, and store data. The engine mounted communication module 102 can communicate with each of the RFID tags to retrieve data transmissions from the RFID tags and to transmit data to the RFID tags for storage.

The engine mounted communication module 102 also communicates with an aircraft mounted engine electronic controller 104 and acts as an intermediary between the electronic controller 104 and the RFID tags. The communication module 102 receives data in the form of RF transmissions from the RFID tags and relays the data to the electronic controller 104. The communication module 102 also receives information from the electronic controller 104 and transmits the information to the RFID tags. In this example, the engine mounted communication module 102 can further communicate wirelessly via cellular transmissions, satellite transmissions, and/or other wireless transmissions to one or more external systems 128 (such as an aircraft maintenance system or engine maintenance system) to download data to the external system 128. In other examples, the engine mounted communication module 102 may not communicate wirelessly.

The engine mounted communication module 102 therefore may include an RF transceiver to facilitate information exchange between the RFID tags and the communication module 102. The engine mounted communication module 102 may also include a cellular transceiver, satellite transceiver, and/or other wireless transceiver to facilitate an information exchange between an external system 128 and the communication module 102.

The LRUs in the example aircraft 100 include an IGV actuator 106, a fuel module 108, a surge control valve 110, a bleed valve 114, a lube module 122, starter/generator system 124 and an exciter 126. The other engine components in the example aircraft 100 include fuel nozzles 112, an inlet scroll 116, turbines and compressor wheels 118, and an engine gearbox mounted nameplate 120. Each of the LRUs and other components in this example includes an associated RFID tag that is mounted on or near the engine component.

The RFID tags are configured to receive data for storage, store received data, and to transmit stored data. In this example, each RFID tag stores static, repair, and dynamic data regarding the LRU or other engine component with which the RFID tag is associated. The static data includes identification information regarding the associated engine component, the repair data including repair history information regarding the associated engine component that is recorded by the RFID tag, for example, during visits by the engine component to a repair shop, and the dynamic data includes engine usage information, component usage information, and component fault information regarding the associated engine component.

The identification information may be stored in the RFID tag around the time the RFID tag is mounted on the engine component. As an example, the identification information for the IGV actuator 106, fuel module 108, surge control valve 110, fuel nozzles 112, bleed valve 114, inlet scroll 116, turbine and compressor wheels 118, engine gearbox nameplate 120, lube module 122, starter/generator systems 124, and exciter 126 may each include a part number and a serial number.

The dynamic data may be periodically updated and received from an engine controller 104 via the control module 102 and stored when received. The dynamic data may include engine usage information, component usage information, and component fault information regarding the engine component. The engine usage information may include operating hours and operating cycles experienced by the engine. The component usage information may include operating hours and operating cycles experienced by the engine component. The component fault information may include fault codes and fault messages.

The dynamic data may include environmental measurements such as temperature, vibration, ice accumulation, and others. The dynamic data for one engine component may be different from the dynamic data for another engine component. As an example, the dynamic data for the IGV actuator 106, fuel module 108, and fuel nozzles 112 may each include temperature, vibration, operating hours and operating cycles. The dynamic data for the surge control valve 110 and the exciter 126 may each include total operating hours and operating cycles. The dynamic data for the bleed valve 114 may include temperature, vibration, operating hours and open/close cycles. The dynamic data for the inlet scroll 116 may include ice accumulation, operating hours, and operating cycles. The dynamic data for the lube module 122 may include temperature, operating hours, and operating cycles. The dynamic data for the turbine and compressor wheels 118, engine gearbox nameplate 120, and starter/generator systems 124 may include operating hours and operating cycles.

The engine electronic control module 104 may comprise one or more processors and be configured by computer programming instructions to perform its functions. The engine electronic control module 104 may be configured to retrieve, using the communication module, static data and repair data from each RFID tag, store the static data and the repair data for each engine component in a database in storage media accessible by the controller, and store dynamic data in the database for each engine component, for example, after each engine cycle. The engine electronic control module 104 may also be configured to transmit, using the communication module, dynamic data regarding an engine component to each engine component's associated RFID tag, for example, after each engine cycle for storage in the RFID tag. The engine electronic control module 104 in this example is further configured to perform operations to transmit, using the communication module, the static data, the repair data, and the dynamic data to the external system 128.

Operations performed by the engine electronic control module 104 to store dynamic data may include operations to retrieve dynamic data for each engine component from the database, operations to update the dynamic data for each engine component after an engine cycle, operations to transmit the updated dynamic data regarding its associated engine component to each RFID tag for storage by the RFID tag, and operations to test that each RFID tag stored the updated dynamic data for its associated engine component.

Operations performed by the engine electronic control module 104 to test that each RFID tag stored the updated dynamic data for its associated engine component may include operations to retrieve the stored dynamic data from each RFID tag and operations to compare the retrieved dynamic data with the updated dynamic data.

Figure 2:
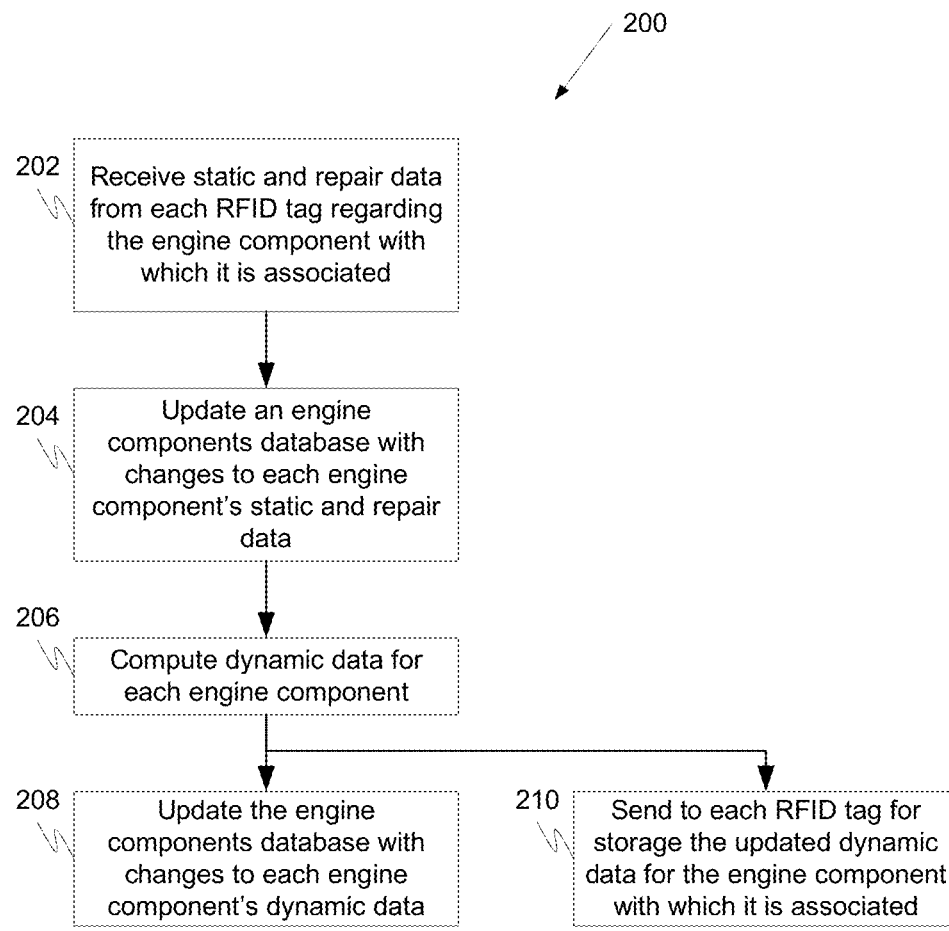
FIG. 2 is a process flow chart depicting an example process in an aircraft-mounted controller for tracking engine component life cycle data, in accordance with some embodiments.

FIG. 2 is a process flow chart depicting an example process 200 in an aircraft-mounted controller for tracking engine component life cycle data. The example process 200 includes operations to receive static and repair data from each RFID tag regarding the engine component with which it is associated (operation 202). The static data may include identification information regarding the associated engine component such as a part number and a serial number. The repair data may include repair history information regarding the associated engine component that is recorded by the RFID tag, for example, during visits by the engine component to a repair shop.

The example process 200 includes operations to update an engine components database with changes to each engine component's static and repair data (operation 204). After receiving static and repair data from one or more RFID tags, the database may be updated with any observed changes. Alternatively, the entry for an engine component may be over written with received static and/or repair data from one or more RFID tags regardless of whether the received data has any changes.

The example process 200 includes operations to compute dynamic data for each engine component (operation 206). The dynamic data may include engine usage information, component usage information, and component fault information regarding the engine component. The engine usage information may include operating hours and operating cycles experienced by the engine. The component usage information may include operating hours and operating cycles experienced by the engine component. The component fault information may include fault codes and fault messages. The dynamic data may include environmental measurements such as temperature, vibration, ice accumulation, and others. The dynamic data for one engine component may be different from the dynamic data for another engine component. The computation of dynamic data may take place during each engine cycle, after each engine cycle or prior to the beginning of the next engine cycle.

The example process 200 includes operations to update the engine components database with changes to each engine component's dynamic data (operation 208). After computing dynamic data for one or more engine components, the engine components database may be updated with any observed changes. Alternatively, the entry for an engine component may be over written with newly computed dynamic data for one or more engine components regardless of whether the computed data has changed. The dynamic data updating may take place during each engine cycle, after each engine cycle or prior to the beginning of the next engine cycle.

The example process 200 also includes operations to send to each RFID tag for storage the updated dynamic data for the engine component with which it is associated (operation 210). The dynamic data may be sent to one or more RFID tags prior to, in parallel with, or after the engine components database is updated. The dynamic data may be sent to one or more RFID tags during each engine cycle, after each engine cycle or prior to the beginning of the next engine cycle.

Figure 3:
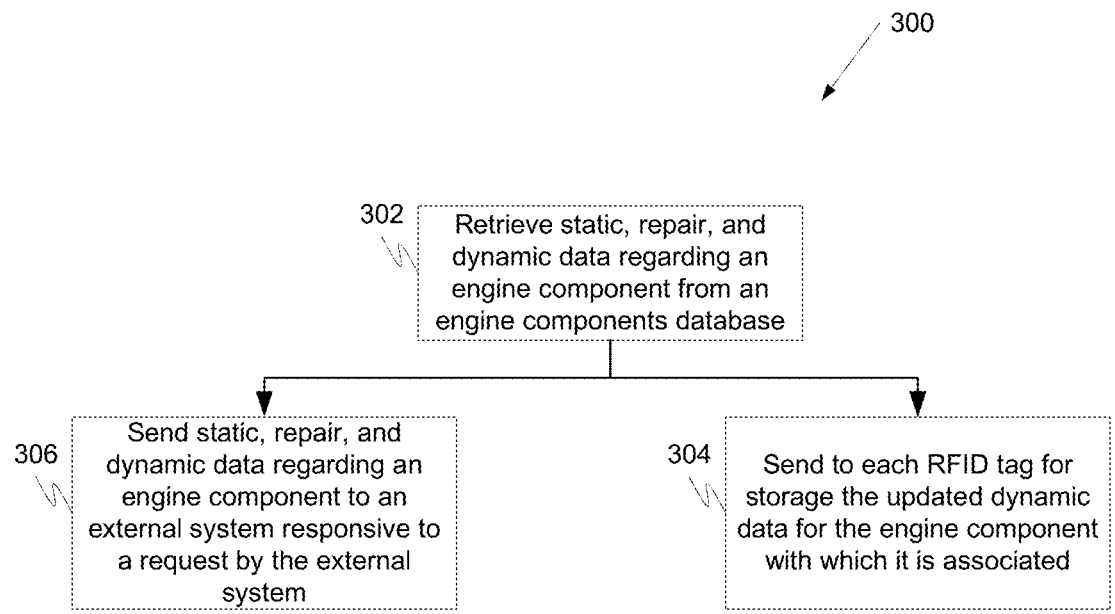
FIG. 3 is a process flow chart depicting another example process in an aircraft-mounted controller for tracking engine component life cycle data, in accordance with some embodiments.

FIG. 3 is a process flow chart depicting another example process 300 in an aircraft-mounted controller for tracking engine component life cycle data. The example process 300 includes operations to retrieve from a component database static data, repair data, and dynamic data regarding a plurality of engine components (operation 302). The static data includes identification information regarding the engine component such as a part number and a serial number. The repair data may include repair history information regarding the associated engine component that is recorded by the RFID tag, for example, during visits by the engine component to a repair shop. The dynamic data may include engine usage information, component usage information, and component fault information regarding the engine component. The engine usage information may include operating hours and operating cycles experienced by the engine. The component usage information may include operating hours and operating cycles experienced by the engine component. The component fault information may include fault codes and fault messages. The dynamic data may include environmental measurements such as temperature, vibration, ice accumulation, and others. The dynamic data for one engine component may be different from the dynamic data for another engine component.

The example process 300 includes operations to transmit, using the communication module, the dynamic data regarding the associated engine component to each RFID tag for storage in the RFID tag (operation 304). The dynamic data may be sent to one or more RFID tags during an engine cycle, after an engine cycle or prior to the beginning of an engine cycle.

The example process 300 includes operations to transmit, using the communication module, static data, repair data, and dynamic data regarding one of the engine components to an external system responsive to a request by the external system (operation 306). The static data, repair data, and dynamic data may be sent for one, a plurality of or all RFID tags responsive to a request. The static data, repair data, and dynamic data may be sent prior to, in parallel with, or after the dynamic data is sent to one or more RFID tags. The static data, repair data, and dynamic data may be sent during an engine cycle, after an engine cycle or prior to the beginning of an engine cycle.

Figure 4:
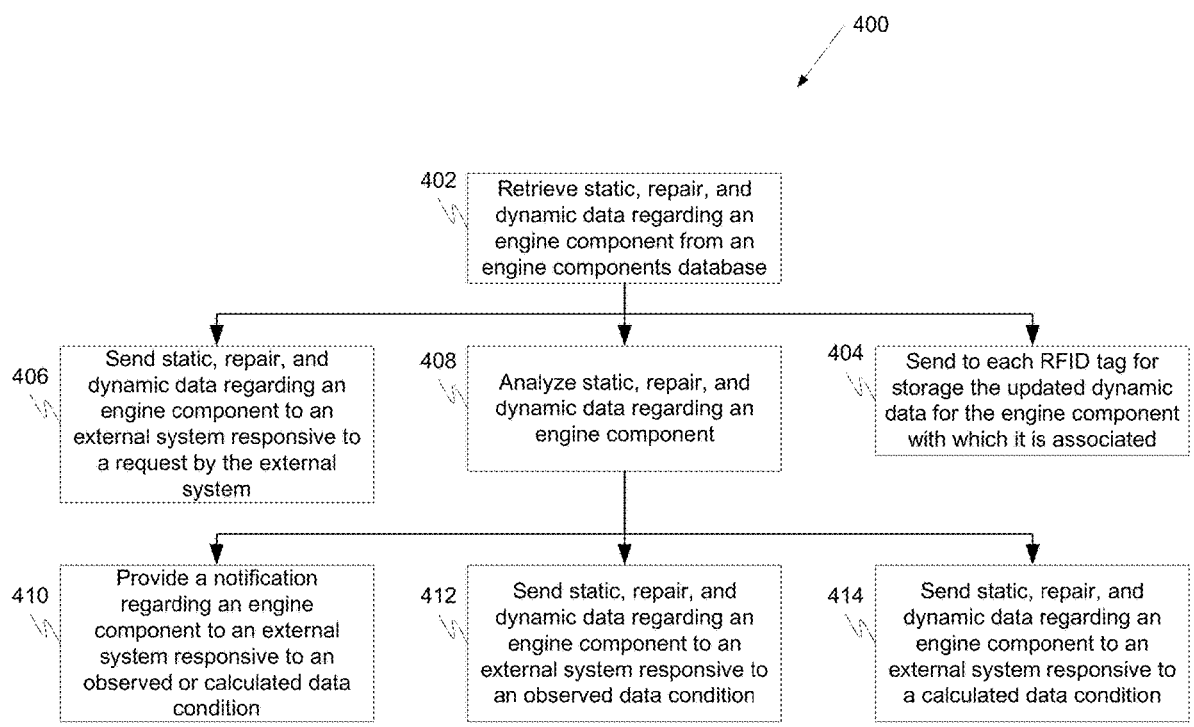
FIG. 4 is a process flow chart depicting another example process in an aircraft-mounted controller for tracking engine component life cycle data, in accordance with some embodiments.

FIG. 4 is a process flow chart depicting another example process 400 in an aircraft-mounted controller for tracking engine component life cycle data. The example process 400 includes operations to retrieve from a component database static data, repair data, and dynamic data regarding the plurality of engine components (operation 402). The static data includes identification information regarding the engine component such as a part number and a serial number. The repair data may include repair history information regarding the associated engine component that is recorded by the RFID tag, for example, during visits by the engine component to a repair shop. The dynamic data may include engine usage information, component usage information, and component fault information regarding the engine component. The engine usage information may include operating hours and operating cycles experienced by the engine. The component usage information may include operating hours and operating cycles experienced by the engine component. The component fault information may include fault codes and fault messages. The dynamic data may include environmental measurements such as temperature, vibration, ice accumulation, and others. The dynamic data for one engine component may be different from the dynamic data for another engine component.

The example process 400 includes operations to transmit, using the communication module, the dynamic data regarding the associated engine component to each RFID tag for storage in the RFID tag (operation 404). The dynamic data may be sent to one or more RFID tags during an engine cycle, after an engine cycle or prior to the beginning of an engine cycle.

The example process 400 includes operations to transmit, using the communication module, static data, repair data, and dynamic data regarding one of the engine components to an external system responsive to a request by the external system (operation 406). The static data, repair data, and dynamic data may be sent for one, a plurality of or all RFID tags responsive to a request. The static data, repair data, and dynamic data may be sent prior to, in parallel with, or after the dynamic data is sent to one or more RFID tags. The static data, repair data, and dynamic data may be sent during an engine cycle, after an engine cycle or prior to the beginning of an engine cycle.

The example process 400 includes operations to analyze the dynamic data regarding at least one engine component (operation 408). After the analysis, the example process 400 includes operations to transmit, using the communication module, a notification regarding at least one engine component to a system external to the aircraft responsive to a condition observed or calculated from the dynamic data (operation 410). After the analysis, the example process 400 includes operations to transmit, using the communication module, static data, repair data, and dynamic data regarding the at least one engine component to a system external to the aircraft responsive to a condition observed from the dynamic data (operation 412). After the analysis, the example process 400 also includes operations to transmit, using the communication module, static data, repair data, and dynamic data regarding the at least one engine component to a system external to the aircraft responsive to a condition calculated from the dynamic data (operation 414). The notification, static data, repair data, and/or dynamic data may be sent during an engine cycle, after an engine cycle or prior to the beginning of an engine cycle.

Figure 5:
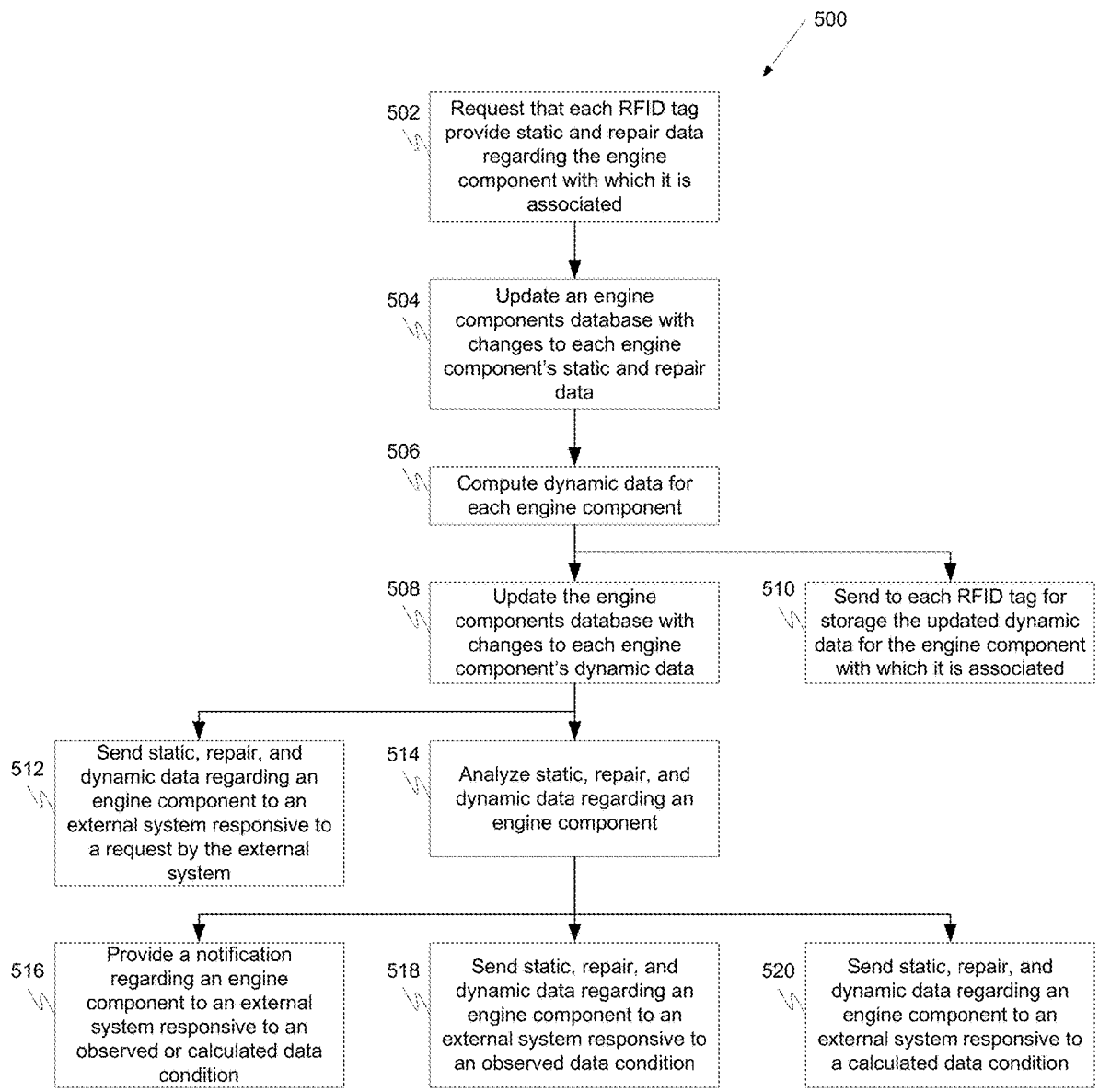
FIG. 5 is a process flow chart depicting another example process in an aircraft-mounted controller for tracking engine component life cycle data, in accordance with some embodiments.

FIG. 5 is a process flow chart depicting another example process 500 in an aircraft-mounted controller for tracking engine component life cycle data. The example process 500 includes operations to request that each RFID tag provide static and repair data regarding the engine component with which it is associated (operation 502). The static data may include identification information regarding the associated engine component such as a part number and a serial number. The repair data may include repair history information regarding the associated engine component that is recorded by the RFID tag, for example, during visits by the engine component to a repair shop.

The example process 500 includes operations to update an engine components database with changes to each engine component's static and repair data (operation 504). After receiving static and repair data from one or more RFID tags, the database may be updated with any observed changes. Alternatively, the entry for an engine component may be over written with received static and/or repair data from one or more RFID tags regardless of whether the received data has any changes.

The example process 500 includes operations to compute dynamic data for each engine component (operation 506). The dynamic data may include engine usage information, component usage information, and component fault information regarding the engine component. The engine usage information may include operating hours and operating cycles experienced by the engine. The component usage information may include operating hours and operating cycles experienced by the engine component. The component fault information may include fault codes and fault messages. The dynamic data may include environmental measurements such as temperature, vibration, ice accumulation, and others. The dynamic data for one engine component may be different from the dynamic data for another engine component. The computation of dynamic data may take place during each engine cycle, after each engine cycle or prior to the beginning of the next engine cycle.

The example process 500 includes operations to update the engine components database with changes to each engine component's dynamic data (operation 508). After computing dynamic data for one or more engine components, the engine components database may be updated with any observed changes. Alternatively, the entry for an engine component may be over written with newly computed dynamic data for one or more engine components regardless of whether the computed data has changed. The dynamic data updating may take place during each engine cycle, after each engine cycle or prior to the beginning of the next engine cycle.

The example process 500 also includes operations to send to each RFID tag for storage the updated dynamic data for the engine component with which it is associated (operation 510). The dynamic data may be sent to one or more RFID tags prior to, in parallel with, or after the engine components database is updated. The dynamic data may be sent to one or more RFID tags during each engine cycle, after each engine cycle or prior to the beginning of the next engine cycle.

The example process 500 includes operations to transmit, using the communication module, static data, repair data, and dynamic data regarding one of the engine components to an external system responsive to a request by the external system (operation 512). The static data, repair data, and dynamic data may be sent for one, a plurality of, or all RFID tags responsive to a request. The static data, repair data, and dynamic data may be sent prior to, in parallel with, or after the dynamic data is sent to one or more RFID tags. The static data, repair data, and dynamic data may be sent during an engine cycle, after an engine cycle or prior to the beginning of an engine cycle.

The example process 500 includes operations to analyze the dynamic data regarding at least one engine component (operation 514). After the analysis, the example process 500 includes operations to transmit, using the communication module, a notification regarding at least one engine component to a system external to the aircraft responsive to a condition observed or calculated from the dynamic data (operation 516). After the analysis, the example process 500 includes operations to transmit, using the communication module, static data, repair data, and dynamic data regarding the at least one engine component to a system external to the aircraft responsive to a condition observed from the dynamic data (operation 518). After the analysis, the example process 500 also includes operations to transmit, using the communication module, static data, repair data, and dynamic data regarding the at least one engine component to a system external to the aircraft responsive to a condition calculated from the dynamic data (operation 520). The notification, static data, repair data, and/or dynamic data may be sent during an engine cycle, after an engine cycle or prior to the beginning of an engine cycle.

Described herein are techniques for tracking engine component life cycle data. RFID tags positioned around the engine on or near LRUs and other engine components can record identification information regarding the associated engine component such as a part number and a serial number, repair data such as repair history information regarding the associated engine component, and dynamic data such as engine usage information, component usage information, component fault information, and environmental measurements such as temperature, vibration, ice accumulation, and others regarding the engine component. A controller can record the identification information, the repair data, and dynamic data for each engine component in a database and transmit specific engine component dynamic data to the RFID tags for storage. The controller can be configured to analyze the data and provide notifications regarding component conditions. The system allows for a bill of material of engine components to be automatically recorded and combined with actual component operation hours and cycle data. This can provide an automated tracking system for tracking LRU life in hours or Mean Time Between Removals or Overhaul. The automatic writing of the dynamic information directly to the RFID tag may allow improved tracking of component hours for maintenance and reliability data tracking. The system may allow for improved engine health monitoring algorithms and component reliability data tracking.

In one embodiment, an engine-mounted component life cycle data tracking system is provided. The system comprises a plurality of radio frequency identification (RFID) tags positioned around an aircraft engine wherein each RFID tag is associated with and positioned proximate to a different engine component and each RFID tag configured to transmit and store data regarding its associated engine component. The system further comprises an engine-mounted communication module configured to read data from and write data to each RFID tag and an aircraft-mounted controller in communication with the engine-mounted communication module. The aircraft-mounted controller is configured to perform operations to retrieve, using the communication module, static data and repair data from each RFID tag wherein the static data includes identification information regarding the engine components and the repair data includes repair history information regarding the engine components resulting from any visit by any of the engine components to any repair shop. The aircraft-mounted controller is further configured to store the static data and the repair data for each engine component in a database in the controller and store dynamic data in the database for each engine component after each engine cycle wherein the dynamic data comprises engine usage information, component usage information, and component fault information regarding the engine component. The aircraft-mounted controller is further configured to transmit, using the communication module, the dynamic data regarding the engine component to each RFID tag after each engine cycle for storage in the RFID tag.

These aspects and other embodiments may include one or more of the following features. The operations to store dynamic data may comprise operations to retrieve dynamic data for each engine component from the database, update the dynamic data for each engine component after an engine cycle, transmit the updated dynamic data regarding the associated engine component to each RFID tag for storage, and test that each RFID tag stored the updated dynamic data for its associated engine component. The operations to test may comprise operations to retrieve the stored dynamic data from each RFID tag and compare the retrieved dynamic data with the updated dynamic data. The communication module may be further configured to communicate wirelessly with an external system. The controller may be further configured to perform operations to transmit, using the communication module, the static data, the repair data, and the dynamic data to the external system. The engine usage information may comprise operating hours and operating cycles experienced by the engine, the component usage information may comprise operating hours and operating cycles experienced by the engine component, and the component fault information may comprise fault codes and fault messages. The engine components may comprise a plurality of line replaceable units (LRUs) and a plurality of components other than LRUs.

In another embodiment, an engine component data tracking system is provided. The system comprises an engine-mounted communication module configured to read data from and write data to a plurality of radio frequency identification (RFID) tags positioned around an aircraft engine wherein each RFID tag is associated with and positioned proximate to a different one of a plurality of engine components and each RFID tag is configured to transmit and store data regarding its associated engine component. The system further comprises an aircraft-mounted controller in communication with the engine-mounted communication module. The aircraft-mounted controller is configured to perform operations to retrieve from a component database static data, repair data, and dynamic data regarding the plurality of engine components wherein the static data includes identification information regarding the engine component, the repair data includes repair history information regarding the engine component resulting from any visit by the engine component to any repair shop, and the dynamic data comprises engine usage information, component usage information, and component fault information regarding the engine component. The aircraft-mounted controller is further configured to perform operations to transmit, using the communication module, the dynamic data regarding the engine component to each RFID tag after each engine cycle for storage in the RFID tag and transmit, using the communication module, static data, repair data, and dynamic data regarding one of the engine components to an external system responsive to a request by the external system.

These aspects and other embodiments may include one or more of the following features. The aircraft-mounted controller may be further configured to perform operations to analyze the dynamic data regarding at least one engine component. The aircraft-mounted controller may be further configured to transmit, using the communication module, a notification regarding the at least one engine component to a system external to the aircraft responsive to a condition observed or calculated from the dynamic data. The aircraft-mounted controller may be further configured to transmit, using the communication module, static data, repair data, and dynamic data regarding the at least one engine component to a system external to the aircraft responsive to a condition observed or calculated from the dynamic data. The communication module may be further configured to communicate wirelessly with the external system. The engine usage information may comprise operating hours and operating cycles experienced by the engine, the component usage information may comprise operating hours and operating cycles experienced by the engine component, and the component fault information may comprise fault codes and fault messages. The engine components may comprise a plurality of line replaceable units (LRUs) and a plurality of components other than LRUs. The controller may be engine mounted.

In another embodiment, an aircraft-mounted controller is provided. The controller comprises one or more processors and non-transient computer readable media encoded with programming instructions that cause the one or more processors to implement a method. The implemented method comprises reading data from and writing data to a plurality of radio frequency identification (RFID) tags positioned around an aircraft engine wherein each RFID tag is associated with and positioned proximate to a different one of a plurality of engine components and each RFID tag is configured to transmit and store data regarding its associated engine component. The method further comprises storing in a component database static data, repair data, and dynamic data regarding the plurality of engine components wherein the static data includes identification information regarding the engine component, the repair data includes repair history information regarding the engine component that is recorded by the RFID tag during visits by the engine component to a repair shop, and the dynamic data comprises engine usage information, component usage information, and component fault information regarding the engine component. The method further comprises transmitting the dynamic data regarding the engine component to each RFID tag after each engine cycle for storage in the RFID tag and transmitting static data, repair data, and dynamic data regarding one of the engine components to an external system responsive to a request by the external system.

These aspects and other embodiments may include one or more of the following features. The controller may be further configured to perform operations to analyze the dynamic data regarding at least one engine component. The controller may be further configured to transmit a notification regarding the at least one engine component to a system external to the aircraft responsive to a condition observed or calculated from the dynamic data. The controller may be further configured to transmit static data, repair data, and dynamic data regarding the at least one engine component to a system external to the aircraft responsive to a condition observed or calculated from the dynamic data. The engine usage information may comprise operating hours and operating cycles experienced by the engine, the component usage information may comprise operating hours and operating cycles experienced by the engine component, and the component fault information may comprise fault codes and fault messages. The engine components may comprise a plurality of line replaceable units (LRUs) and a plurality of components other than LRUs. The controller may be engine mounted. The controller may comprise an engine mounted communications module.

In another embodiment, an engine mounted communications module is provided. The engine mounted communications module comprises one or more processors and non-transient computer readable media encoded with programming instructions that cause the one or more processors to implement a method. The implemented method comprises reading data from and writing data to a plurality of radio frequency identification (RFID) tags positioned around an aircraft engine wherein each RFID tag is associated with and positioned proximate to a different one of a plurality of engine components and each RFID tag is configured to transmit and store data regarding its associated engine component. The method further comprises storing in a component database static data, repair data, and dynamic data regarding the plurality of engine components wherein the static data includes identification information regarding the engine component, the repair data includes repair history information regarding the engine component that is recorded by the RFID tag during visits by the engine component to a repair shop, and the dynamic data comprises engine usage information, component usage information, and component fault information regarding the engine component. The method further comprises transmitting the dynamic data regarding the engine component to each RFID tag after each engine cycle for storage in the RFID tag and transmitting static data, repair data, and dynamic data regarding one of the engine components to an external system responsive to a request by the external system.

These aspects and other embodiments may include one or more of the following features. The engine mounted communications module may be further configured to perform operations to analyze the dynamic data regarding at least one engine component. The engine mounted communications module may be further configured to transmit a notification regarding the at least one engine component to a system external to the aircraft responsive to a condition observed or calculated from the dynamic data. The engine mounted communications module may be further configured to transmit static data, repair data, and dynamic data regarding the at least one engine component to a system external to the aircraft responsive to a condition observed or calculated from the dynamic data. The engine usage information may comprise operating hours and operating cycles experienced by the engine, the component usage information may comprise operating hours and operating cycles experienced by the engine component, and the component fault information may comprise fault codes and fault messages. The engine components may comprise a plurality of line replaceable units (LRUs) and a plurality of components other than LRUs.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. As an example, in other embodiments the example processes 200, 300, 400, and 500 may be performed by an engine-mounted communication module. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine-mounted component life cycle data tracking system for an engine, comprising:
 a plurality of radio frequency identification (RFID) tags, each associated with, positioned proximate to, and configured to transmit and store identification data and repair history data regarding a different engine component of a plurality of engine components, operating hours and operating cycles experienced by the engine, operating hours and operating cycles experienced by the different engine component of the plurality of engine components, and component fault information to the extent it exists for the different engine component of the plurality of engine components; and
 an aircraft-mounted controller including non-transitory computer readable storage media, the controller configured to:
  retrieve identification and repair history data from the RFID tags and store the retrieved identification data and repair history data in the storage media;
  determine, after each engine cycle, the operating hours and operating cycles experienced by the engine, the operating hours and operating cycles experienced by each of the plurality of engine components, and component fault information to the extent it exists for each of the plurality of engine components;
  store dynamic data comprising the operating hours and operating cycles experienced by the engine, the operating hours and operating cycles experienced by each of the plurality of engine components, and component fault information to the extent it exists for each of the plurality of engine components in the storage media after each engine cycle; and
  transmit to each RFID tag after each engine cycle for storage the operating hours and operating cycles experienced by the engine, the operating hours and operating cycles experienced by an engine component, and component fault information to the extent it exists for the engine component;
 wherein after each engine cycle the aircraft-mounted controller includes in its non-transitory computer readable storage media a database of the identification, repair history and dynamic data for the plurality of engine components, and wherein after each engine cycle each RFID tag includes the identification and repair history data for its associated engine component, the operating hours and operating cycles experienced by the engine, the operating hours and operating cycles experienced by its associated engine component, and component fault information to the extent it exists for its associated engine component.

2. The system of claim 1 wherein to store dynamic data the controller is configured to:
 retrieve dynamic data for each engine component from the storage media in the aircraft-mounted controller;
 update the dynamic data for each engine component after an engine cycle;
 transmit the updated dynamic data regarding the associated engine component to each RFID tag for storage; and
 test that each RFID tag stored the updated dynamic data for its associated engine component.

3. The system of claim 2 wherein to test the controller is configured to retrieve the stored dynamic data from each RFID tag and compare the retrieved dynamic data with the updated dynamic data.

4. The system of claim 1 wherein the controller is further configured to communicate wirelessly with an external system.

5. The system of claim 4 wherein the controller is further configured to transmit the static data, the repair data, and the dynamic data to the external system.

6. The system of claim 1 wherein:
the component fault information comprises fault codes and fault messages.

7. The system of claim 1 wherein the engine components comprise a plurality of line replaceable units (LRUs) and a plurality of components other than LRUs.

8. An aircraft-mounted controller for tracking engine component data, the controller including non-transitory computer readable storage media configured to store identification, repair history, and dynamic data for a plurality of aircraft engine components having an associated radio frequency identification (RFID) tag that is configured to transmit and store identification, repair history, and dynamic data regarding its associated engine component, the dynamic data comprising engine usage, component usage, and component fault information, the controller configured to:
retrieve identification and repair history data from the RFID tags and store the retrieved identification data and repair history data in the storage media;
determine, after each engine cycle, the operating hours and operating cycles experienced by the engine, the operating hours and operating cycles experienced by each of the plurality of engine components, and component fault information to the extent it exists for each of the plurality of engine components;
store dynamic data comprising the operating hours and operating cycles experienced by the engine, the operating hours and operating cycles experienced by each of the plurality of engine components, and component fault information to the extent it exists for each of the plurality of engine components in the storage media after each engine cycle; and
transmit to each RFID tag after each engine cycle for storage the operating hours and operating cycles experienced by the engine, the operating hours and operating cycles experienced by an engine component, and component fault information to the extent it exists for the engine component;
wherein after each engine cycle the aircraft-mounted controller includes in its non-transitory computer readable storage media a database of the identification, repair history and dynamic data for the plurality of engine components, and wherein after each engine cycle each RFID tag includes the identification and repair history data for its associated engine component, the operating hours and operating cycles experienced by the engine, the operating hours and operating cycles experienced by its associated engine component, and component fault information to the extent it exists for its associated engine component.

9. The aircraft-mounted controller of claim 8, further configured to analyze the dynamic data regarding at least one engine component.

10. The aircraft-mounted controller of claim 9, further configured to transmit a notification regarding the at least one engine component to a system external to the aircraft responsive to a condition observed or calculated from the dynamic data.

11. The aircraft-mounted controller of claim 9, further configured to transmit static data, repair data, and dynamic data regarding the at least one engine component to a system external to the aircraft responsive to a condition observed or calculated from the dynamic data.

12. The aircraft-mounted controller of claim 8, further configured to communicate wirelessly with the external system.

13. The aircraft-mounted controller of claim 8 wherein:
the component fault information comprises fault codes and fault messages.

14. The aircraft-mounted controller of claim 8, wherein the controller is engine mounted.

15. Non-transitory computer readable storage media:
configured to store identification, repair history, and dynamic data for a plurality of aircraft engine components having an associated radio frequency identification (RFID) tag that is configured to transmit and store identification, repair history, and dynamic data regarding its associated engine component, the dynamic data comprising engine usage, component usage, and/or component fault information; and
encoded with programming instructions configurable to cause a processor in a controller on an aircraft to:
retrieve identification and repair history data from the RFID tags and store the retrieved identification data and repair history data in the storage media;
determine, after each engine cycle, the operating hours and operating cycles experienced by the engine, the operating hours and operating cycles experienced by each of the plurality of engine components, and component fault information to the extent it exists for each of the plurality of engine components;
store dynamic data comprising the operating hours and operating cycles experienced by the engine, the operating hours and operating cycles experienced by each of the plurality of engine components, and component fault information to the extent it exists for each of the plurality of engine components in the storage media after each engine cycle; and
transmit dynamic data to each RFID tag after each engine cycle for storage the operating hours and operating cycles experienced by the engine, the operating hours and operating cycles experienced by an engine component, and component fault information to the extent it exists for the engine component;
wherein after each engine cycle the non-transitory computer readable storage media includes a database of the identification, repair history and dynamic data for the plurality of engine components.

16. The non-transitory computer readable media of claim 15, wherein the programming instructions configurable to cause a processor to store dynamic data comprises programming instructions configurable to cause the processor to:
retrieve dynamic data for each engine component from the storage media;
update the dynamic data for each engine component after an engine cycle;
transmit the updated dynamic data regarding the associated engine component to each RFID tag for storage; and
test that each RFID tag stored the updated dynamic data for its associated engine component.

17. The non-transitory computer readable media of claim 16 wherein the programming instructions configurable to cause a processor to test comprises programming instructions configurable to cause the processor to retrieve the stored dynamic data from each RFID tag and compare the retrieved dynamic data with the updated dynamic data.

18. The non-transitory computer readable media of claim 15, wherein the programming instructions are further configurable to cause the processor to transmit the static data, the repair data, and the dynamic data to a system external to the aircraft responsive to a condition observed or calculated from the dynamic data.

19. The non-transitory computer readable media of claim 15, wherein:
the component fault information comprises fault codes and fault messages.

20. The non-transitory computer readable media of claim 15, wherein the programming instructions are further configurable to cause the processor to transmit a notification regarding at least one engine component to a system external to the aircraft responsive to a condition observed or calculated from the dynamic data.

* * * * *